United States Patent [19]

Beck

[11] 4,031,455
[45] June 21, 1977

[54] EXCITATION CIRCUIT FOR BRUSHLESS SYNCHRONOUS WELDING GENERATORS

[75] Inventor: Dieter Beck, Etzenrod, Germany

[73] Assignee: Firma A. van Kaick "AvK" Generatoren- und Motorenwerke, Neu-Isenburg, Germany

[22] Filed: Nov. 25, 1975

[21] Appl. No.: 635,096

[30] Foreign Application Priority Data
Nov. 25, 1974 Germany .......................... 2455643

[52] U.S. Cl. ................................. 322/27; 219/133; 322/59; 322/72
[51] Int. Cl.² ....................... H02P 9/10; H02P 9/38
[58] Field of Search ............... 322/59, 72, 73, 7, 8, 322/27; 219/133, 135

[56] References Cited
UNITED STATES PATENTS

| 3,505,587 | 4/1970 | Carroll et al. | 322/73 X |
| 3,916,292 | 10/1975 | Dirzhis et al. | 322/27 X |

*Primary Examiner*—Robert J. Hickey
*Attorney, Agent, or Firm*—Joseph A. Geiger

[57] ABSTRACT

An excitation control circuit for a brushless synchronous welding generator, in which the stator-mounted excitation winding is fed from a separate voltage source via two parallel-connected power transistors with independently adjustable base circuits, one transistor controlling the excitation current in the idling mode, the other in the welding mode. A change-over switch, responding to an electromagnet in the welding current circuit, alternatingly energizes one transistor, while blocking the other.

5 Claims, 3 Drawing Figures

EXCITATION CIRCUIT FOR BRUSHLESS SYNCHRONOUS WELDING GENERATORS

BACKGROUND OF THE INVENTION

1. Field of the Invention

The present invention relates to welding generators and inverters, and more particularly to an excitation circuit for brushless synchronous welding generators with an external pole exciter.

2. Description of the Prior Art

Presently known brushless synchronous welding generators are controlled by means of an externally supplied three-phase exciter having a stator-mounted excitation winding and a three-phase rotor winding with a series-connected rectifier. This known excitation control circuit has the shortcoming that, because of the dependency of the welding current from the adjusted idling voltage and because of the safety-related limitation of the idling voltage to a maximum of 100 volts, the machine must be so designed that, in order to assure a sufficiently high output in the upper region, the iron of the main machine is near its electrical saturation. It follows from this that the dynamic response of the machine in the area of maximum power output is poor, resulting in a large current-over-time integral, when short-circuited, and in a very slow voltage recovery, following opening of the short circuit.

SUMMARY OF THE INVENTION

Underlying the present invention is the primary objective of devising an improved brushless synchronous welding generator which is so designed that, despite the limitation of the ignition voltage to the prescribed maximum value, the machine operates outside the saturation range, even under welding conditions requiring a high power output. In order to attain this objective, the present invention suggests that the excitation circuit of the exciter machine be provided with two parallel-connected power transistors, each having a potentiometer in its base circuit and controlled by means of a change-over switch in the base circuit in such a way that the transistor bases are alternatingly energized and blocked in the idling and welding modes, respectively.

The present invention thus proposes an arrangement in which the excitation of the welding generator takes place according to different control parameters during idling and during power operation, adapted to the particular requirements, so that the adjustment range for the idling voltage may be held to between 40 and 100 volts, while it is possible to raise the welding current during power operation, independently of the low idling voltage, into a range for which conventional machines would have to have an idling voltage of up to 150 volts. This makes it possible to choose a machine layout which no longer requires operation in or near the saturation range, giving the generator a greatly improved dynamic response behavior.

In a preferred embodiment of the invention, the changeover switch features a pair of parallel reed contacts responding to an electromagnet in the welding current circuit, one of the two contacts being arranged directly in the base circuit of the power transistor controlling the welding current, the other contact opening and closing a branch connection between the negative potential and the base circuit of the power transistor controlling the ignition voltage. This control circuit has proved to be excellently suited for all operational requirements. It was found that the repeated switch-over of the excitation current from the idling mode to the welding mode in response to welding interruptions does not create any damaging voltage surges. The extremely short switching times of the reed contacts, between 0.2 and 0.5 milliseconds, are being completely smoothed over by the response characteristics of the machine. Measurements made during an osculating operation show neither gaps nor peaks.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows.

DESCRIPTION OF THE PREFERRED EMBODIMENT

Figure 1:
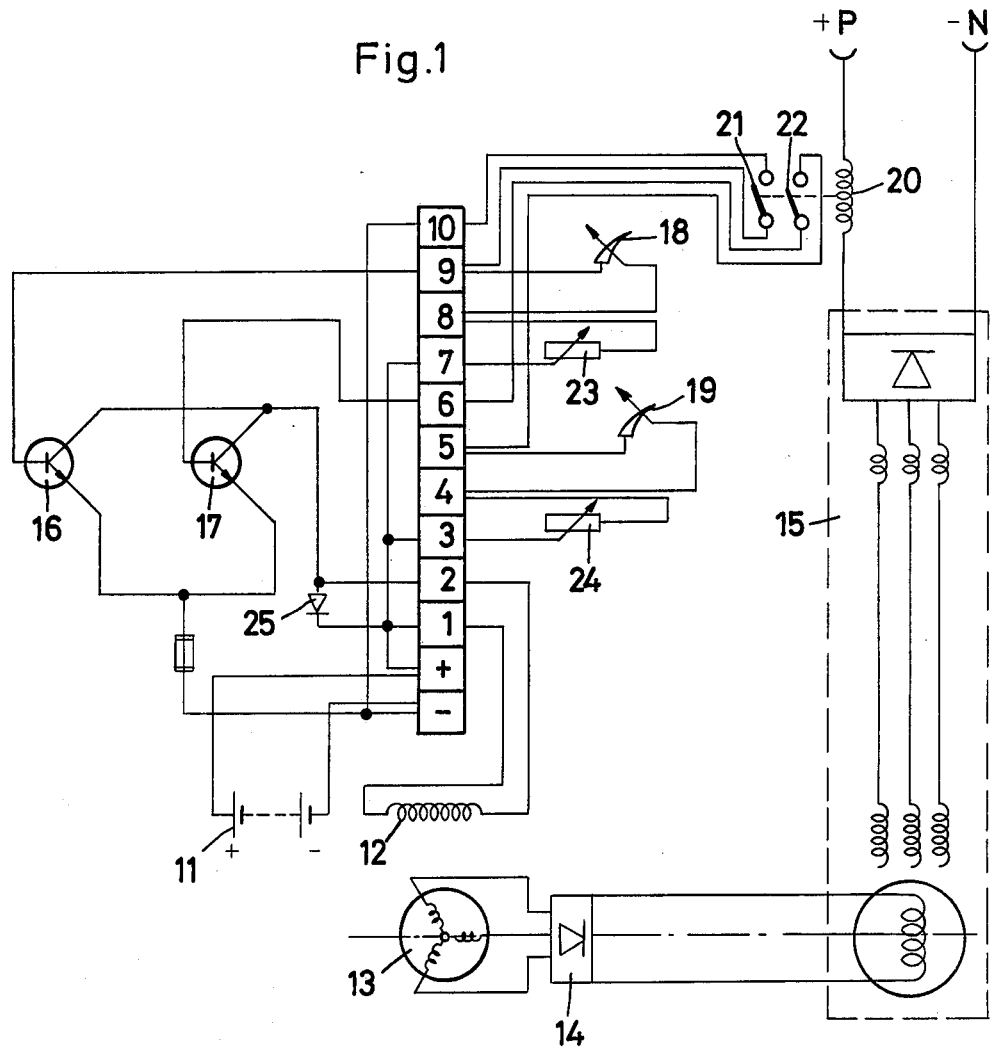
FIG. 1 shows a control circuit diagram in accordance with the present invention.

Referring to FIG. 1, there is shown an excitation control circuit for a welding generator, a separate voltage source 11 supplying electric current to the stator-mounted excitation winding 12 of an exciter machine which further consists of a three-phase rotor winding 13 and a series-connected rectifier 14. The welding generator itself is shown at 15. The current of the excitation winding 12 is controlled by means of two parallel-connected power transistors 16 and 17, via the terminals (+), (1), (2), and (−) of a terminal block, the base circuits of the two transistors containing each a potentiometer 18 or 19, respectively. A change-over switch controls the base circuits of the transistors 16 and 17 in such a way that they are alternatingly connected to the positive and negative potentials, as the operational mode of the machine switches idling to welding operation. The change-over switch consists of a pair of reed contacts 21 and 22, responding to an electromagnet 20. The reed contact 22 directly opens and closes the base circuit of the welding current transistor 17, while the reed contact 21 opens and closes a branch line between the base of the ignition voltage controlling transistor 16 and the negative potential.

In addition to the two potentiometers 18 and 19, the base circuits further include appropriate resistors 23 and 24, respectively, which limit the ranges of the idling voltage and of the welding power, respectively. The power transistors 16 and 17 are additionally protected against inductive surges by means of a bypass diode 25 shunted to the excitation winding 12. The connection of the base of the power transistor 17 to the positive potential in the welding mode — contact 22 closed — takes place via the following terminals and components: (3), (24), (4), (19), (5), (22), (6), and (17). The base of the transistor 16 controlling the ignition voltage is connected directly to the positive potential via (7), (23), (8), (18), and (9), and it can be switched to the negative potential — with reed contact 21 closed — via the branch circuit leading over terminals (9) and (10).

Accordingly, the circuit diagram shown in FIG. 1 illustrates the idling mode of the exciter machine, the reed contacts 21 and 22 being open. With the reed contact 21 thus open, the base of the transistor 16 is connected to the positive potential, via (7), (23), (8), (18), and (9). The base of the transistor 17, on the other hand, is not connected to the voltage source 11, as long as the reed contact 22 remains open. This means that the transistor 17 is blocked. It is thus possible to control and adjust the idling or ignition voltage in the base circuit of transistor 16 by means of the potentiometer 18, the adjustment range being determined by the resistor 23.

Upon closing of the welding current circuit, through contact of the electrodes with a workpiece, for example, the current established in this circuit flows through the electromagnet 20, thereby closing the reed contact 21 and 22. This change-over switch now connects the base circuit of transistor 16 to the negative potential, via (9), (21), and (10), thus blocking this transistor, while simultaneously connecting the base circuit of transistor 17 to the plus potential, via reed contact 22, so that the excitation widing 12 now receives its current over the power transistor 17. Adjustment of the associated potentiometer 19, within the adjustment range determined by the resistor 24, permits convenient control of the welding current, independently of the adjustment of the ignition voltage.

Figure 2:
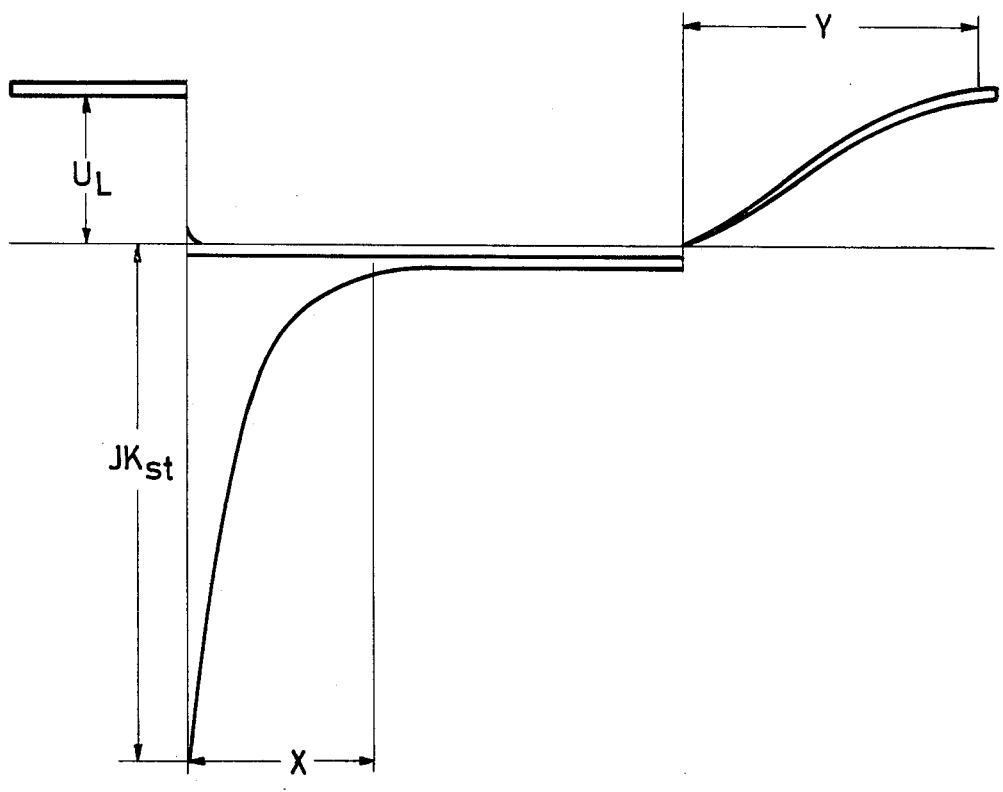
FIG. 2 is a graph showing the readings of voltage and current of a representative prior art welding generator.
Figure 3:
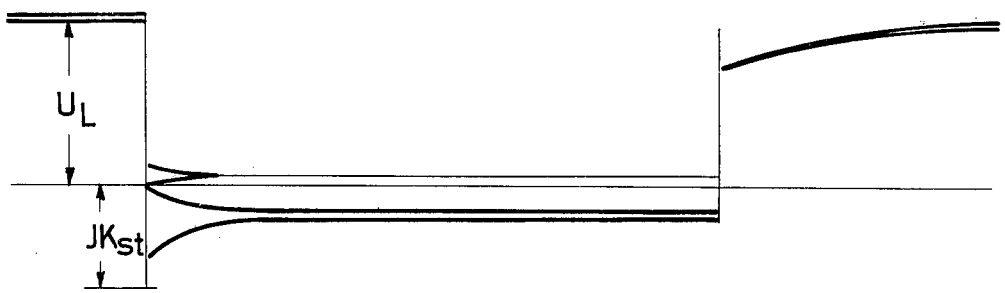
FIG. 3 shows comparable readings of a welding generator featuring the control circuit of FIG. 1.

In FIG. 2 and FIG. 3 are shown comparative readings of voltages and currents in alternating idling and short-circuit operations. The readings obtainable with a welding generator incorporating the present invention are shown in FIG. 3, comparable readings of a prior art welding generator being shown in FIG. 2. The latter clearly illustrates the poor dynamic response behavior of the prior art generator, characterized by a very high short-circuit current $I_{KSt}$, with a correspondingly large current-time integral over the time span $x$, and a very slow voltage recovery over the time span $y$, following opening of the short-circuit. In contrast thereto, the graph of FIG. 3, obtained with a welding generator incorporating the invention, shows a very low short-circuit current and an almost instantaneous recovery of the voltage to its nominal value, following opening of the short-circuit.

It should be understood, of course, that the foregoing disclosure describes only a preferred embodiment of the invention and that it is intended to cover all changes and modifications of this example of the invention which fall within the scope of the appended claims.

I claim the following:

1. In a brushless synchronous welding generator having a three-phase exterior-pole exciter machine including a stator-mounted excitation winding supplied from a separate d. c. voltage source and a three-phase rotor winding connected to a rectifier, an excitation control circuit comprising:
    two power transistors arranged in parallel between said voltage source and the excitation winding, one being operative in the idling mode, the other in the welding mode of the machine;
    switching means for alternatingly activating one transistor and blocking the other in response to the flow or absence of flow of welding current in the welding generator in the welding and idling modes, respectively; and
    means for independently adjusting the base potential of each transistor.

2. An excitation control circuit as defined in claim 1, wherein
    the transistor for the idling mode has a base circuit which, in the idling mode, energizes said transistor by connecting its base to the voltage source via a resistor;
    the transistor for the welding mode has a base circuit which, in the idling mode, is open, thereby blocking said welding transistor;
    the switching means includes a first switch which, in the welding mode, establishes a shunt connection to the voltage source, thereby blocking said idling transistor; and
    the switching means includes a second switch which, in the welding mode, energizes said welding transistor by connecting its base to the voltage source.

3. An excitation control circuit as defined in claim 2, wherein
    the first and second switches of the switching means include reed contacts; and
    the switching means further includes an electromagnet fed by the welding current and cooperating with said reed contacts.

4. An excitation control circuit as defined in claim 2, wherein
    the base potential adjusting means for the two power transistors includes, in each transistor base circuit, a potentiometer and a range-limiting resistor.

5. An excitation control circuit as defined in claim 1, further including
    a bypass diode connected in parallel with the excitation winding, so as to protect said power transistors from inductive surges.

* * * * *